June 2, 1936.　　　T. L. MAISCH　　　2,042,539
HYDRAULIC BRAKE FOR VEHICLES
Filed Nov. 17, 1934　　　4 Sheets-Sheet 1

Inventor:
Theodore L. Maisch
By Walter M. Fuller
Atty.

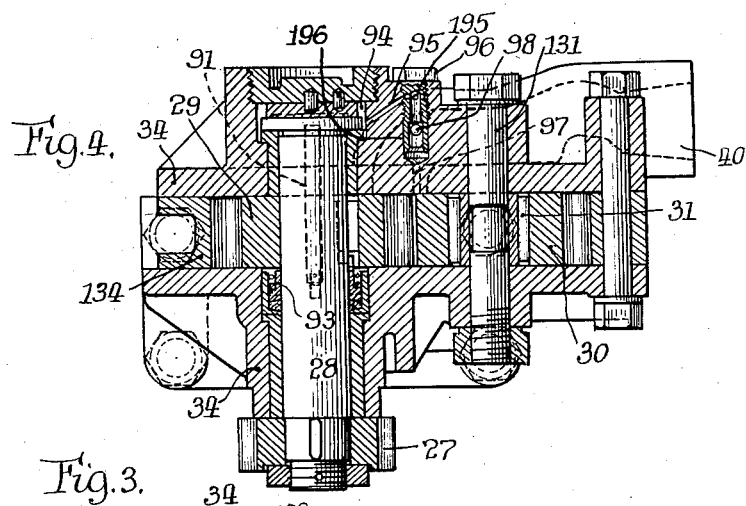
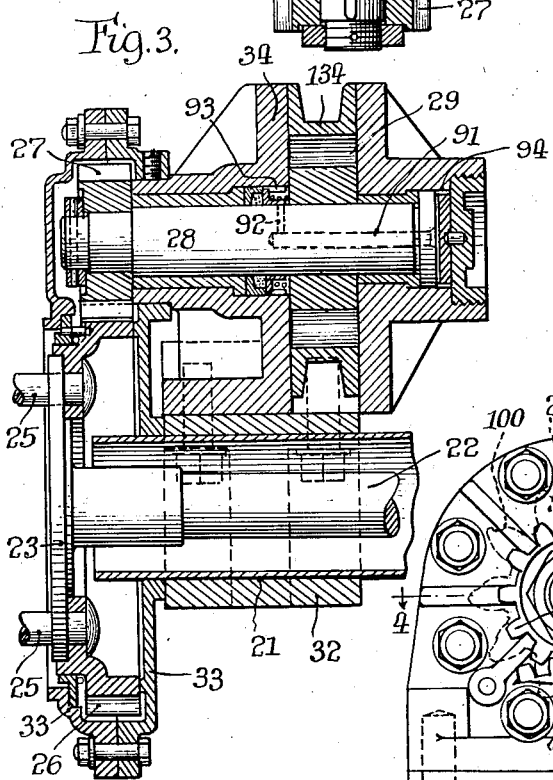
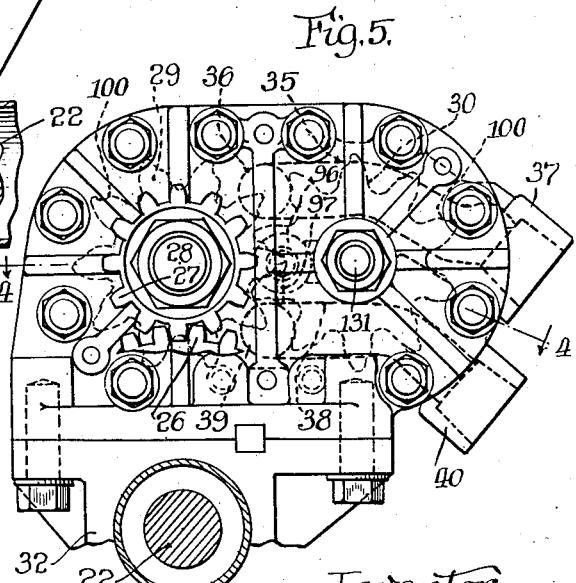

June 2, 1936.  T. L. MAISCH  2,042,539
HYDRAULIC BRAKE FOR VEHICLES
Filed Nov. 17, 1934  4 Sheets-Sheet 3
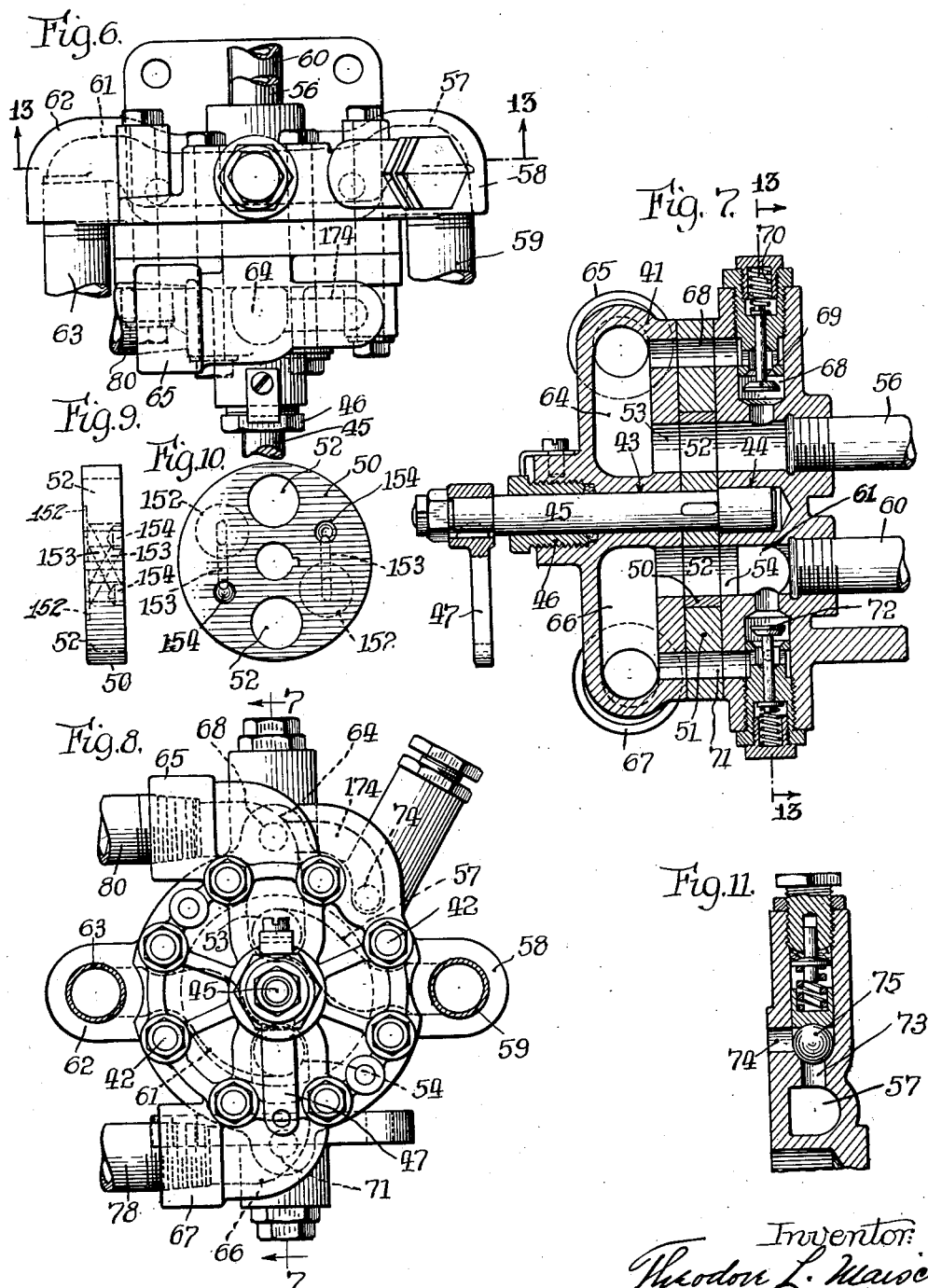

June 2, 1936.  T. L. MAISCH  2,042,539
HYDRAULIC BRAKE FOR VEHICLES
Filed Nov. 17, 1934  4 Sheets-Sheet 4

Inventor
Theodor L. Maisch
By Walter M. Fuller Atty.

Patented June 2, 1936

2,042,539

UNITED STATES PATENT OFFICE 2,042,539

HYDRAULIC BRAKE FOR VEHICLES

Theodore L. Maisch, Chicago, Ill., assignor, by direct and mesne assignments, to Hydraulic Products Co., Chicago, Ill., a corporation of Illinois Application November 17, 1934, Serial No. 753,419

12 Claims. (Cl. 188—92)

My invention relates to brakes for vehicles, such as automobiles, and pertains more particularly to vehicle brakes of strictly hydraulic character as distinguished from those which embody mere hydraulic operating means for expansible and contractible brake-shoes associated with brake-drums mounted on and revoluble with the vehicle-wheels.

In other words, my invention concerns improvements and features of novelty and advantage in brakes involving gear-pumps, or their equivalents, actuated by the vehicle-wheels, the control of the liquid, such as oil, circulated by such pumps governing and regulating the braking action imposed on the wheels.

One feature of the present invention is the provision of means for assuring a substantially unobstructed oil inlet or admission to the one or more brake-pumps of the system when the delivery of the liquid from the pump or pumps is restricted in proper degree to effect the braking function, regardless of whether the vehicle is advancing or moving rearwardly.

A further object of the invention is to provide means for balancing the fluid pressures, at least in substantial measure, on the opposite sides of the main control-valve, which, by its adjustable position, as for instance when partially closed, restricts or retards the flow of oil through its circuit and in so doing applies the brakes.

Another purpose of the invention is to so make the gear-pump structures that, whereas the bearings of the shafts of the gears of the pumps are adequately and thoroughly lubricated, there will be no such building up or augmenting of lubricant pressure as to produce objectionable or detrimental results.

An added aim of the invention is to prevent the continued presence of air-bubbles, of any substantial size, in the oil on which the brake-pumps operate.

In general, the outstanding and underlying purpose of the invention is to provide a gear-pump brake-mechanism adequately protected from mud, water, etc., and of simple construction and of relatively small cost which will function efficiently and satisfactorily under all ordinary service conditions, including an equal braking action at all times on all of the vehicle-wheels equipped with the gear-pumps, both when the vehicle is traveling forwardly or rearwardly and with no necessity for adjustment of mechanical parts because of wear, such as is the common occurrence in connection with brakes having cooperating friction surfaces.

To the accomplishment of these and other desirable aims and objects, a present preferred embodiment of the invention has been produced and this is illustrated in detail in the accompanying drawings forming a part of this specification and to which reference should be had in connection with the following detailed description, like reference numerals, for simplicity, having been employed to designate the same parts of the structure throughout the several views of the drawings.

In these drawings:—

Figure 12:
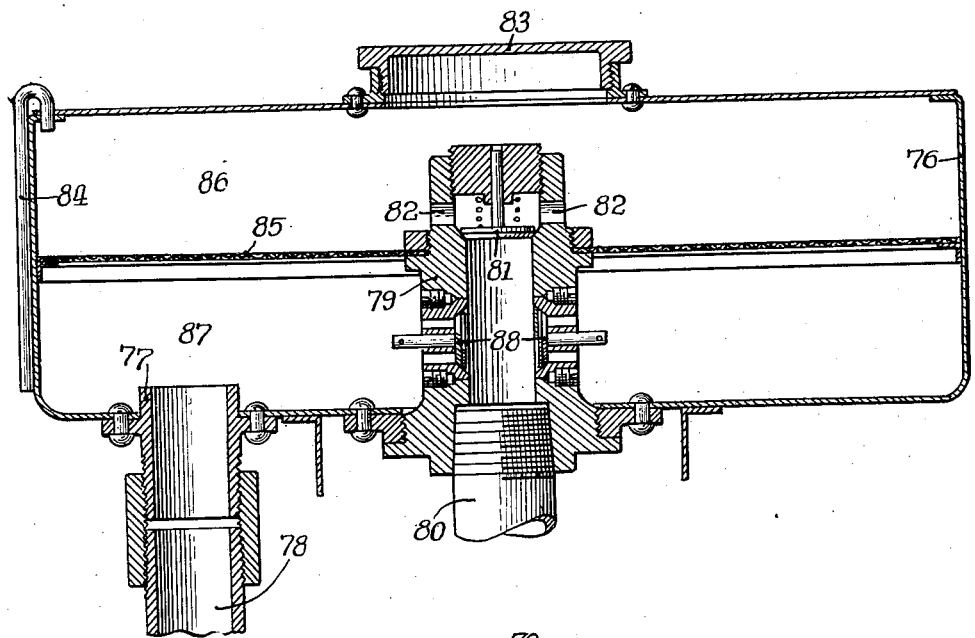

Figures 3, 4, and 5 are views of one of the gear-pumps constituting one of the brakes, Figure 3 being a vertical section through the rear axle of the vehicle, Figure 4 being a section on line 4—4 of Figure 5, and Figure 5 being an elevation of the portion of the structure presented in Figure 4 with the rear axle and its housing in section;

Figures 6, 7, and 8 are views of the main controlling valve, Figure 6 being a plan of the structure depicted in Figure 8, Figure 7 being a section on line 7—7 of Figure 8, and Figure 8 being an elevation of the structure shown in Figure 6;

Figures 9 and 10 illustrate the ported rotor or valve proper;

Figure 11 is a section through the safety-valve employed in association with the main-valve;

Figure 12 is a vertical section through the liquid supply-tank; and

Figure 13:
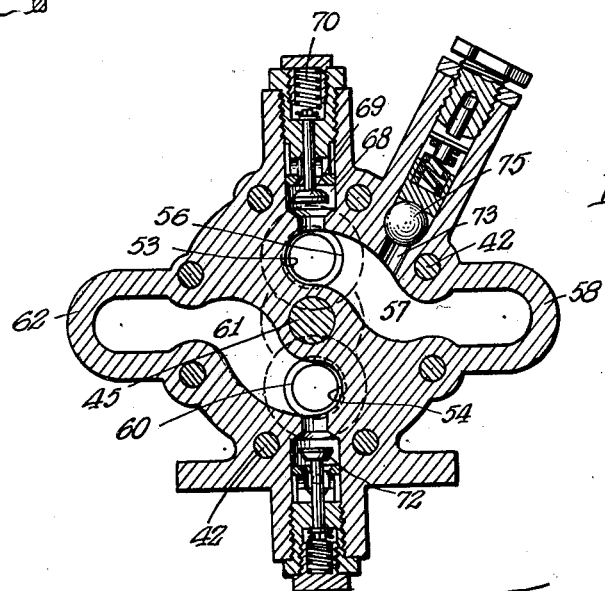

Figure 13 is a vertical section on lines 13—13 of Figures 6 and 7.

Figure 1:
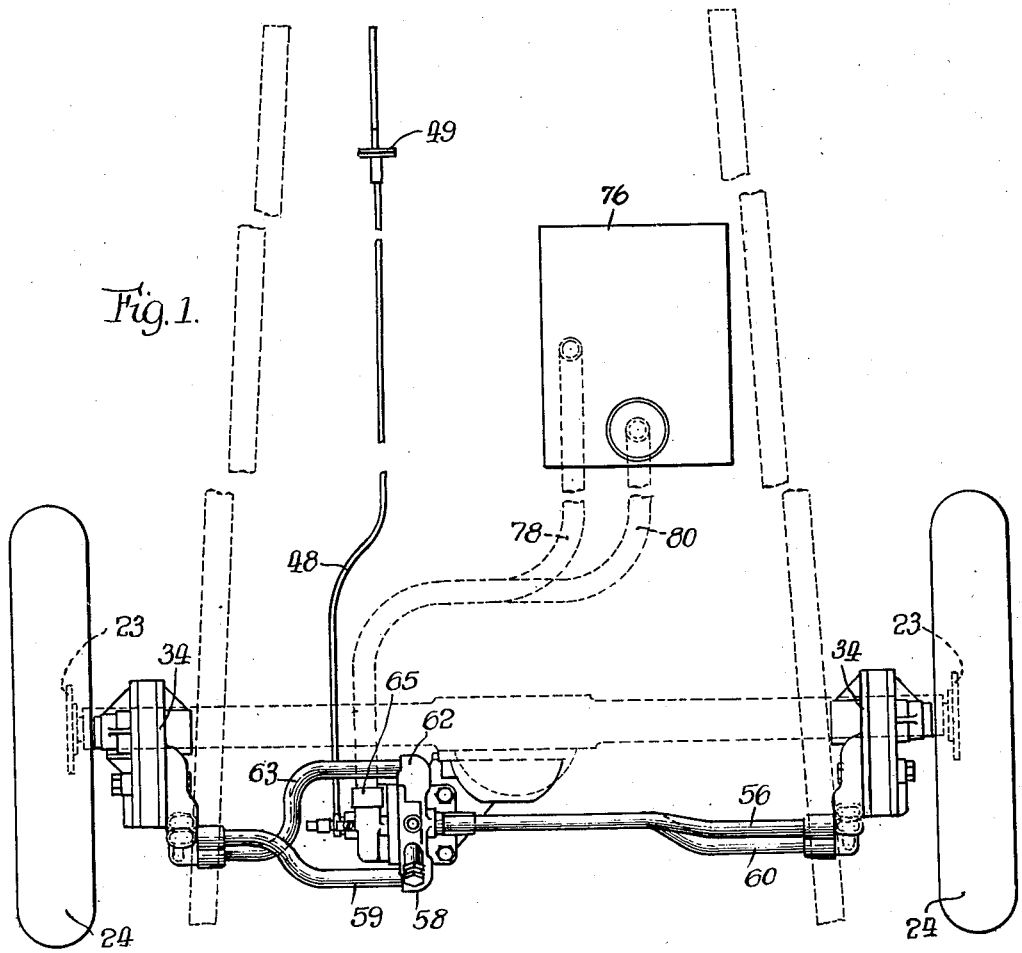
Figure 1 is a fragmentary plan view of the new construction with parts broken away.
Figure 2:
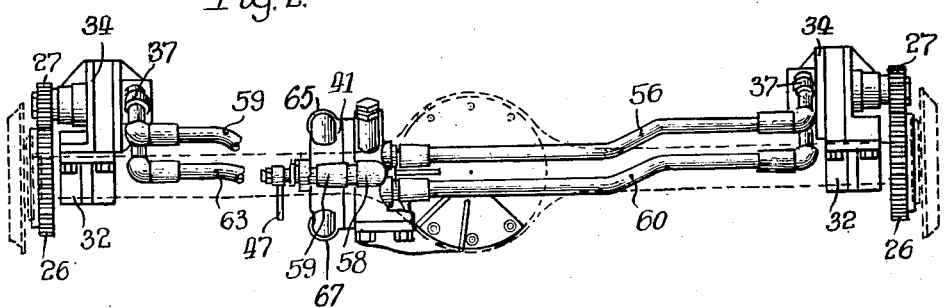
Figure 2 is a rear elevation of the same with parts omitted.

Referring to the drawings, and more particularly to Figure 3, it will be perceived that the rear-axle housing 21 accommodates the rear-axle 22 which at its outer end has a disc 23 to which the corresponding vehicle-wheel 24 (Fig. 1) is fastened by threaded studs or bolts 25, 25, which also secure to the disc a spur-gear 26 (Fig. 3) in mesh with a smaller gear 27 on a suitably-journaled pump-shaft 28 to which one of the pump-gears 29 is fastened, such member 29 having its teeth in mesh with the companion pump-gear 30 revoluble on a roller bearing 31 on a fixed shaft 131.

A supporting member 32 is welded or otherwise secured to the rear-axle housing 21, a divided casing 33 encloses gears 26 and 27, and a sectional gear-pump casing 34, including an intermediate ring 134 surrounding the pump-gears, is carried on the support 32.

As is clearly shown, the several parts of the gear-pump casing are held securely in assembled relation by a number of bolts and nuts, the sections of the housing 33, 33 being similarly bound together.

In order that the oil or other appropriate liquid of the system acted on by the pump may not be trapped in the spaces between the teeth of one gear of the pump by the entering teeth of the correlated gear, each tooth of each gear is cut away on one side at 100 to allow the ready expulsion or discharge of the oil from the gaps between the teeth by the entrance of the companion teeth thereinto.

A passage 35, opening at 36 into the interior of the pump-chamber just above the intermeshing tooth portions of the pump-gears 29 and 30, leads to the exterior of the pump-casing terminating in a pipe-connection 37, and, in similar manner, a companion or complementary passage 38 opening into the pump-chamber at 39 just below the interfitting tooth portions of the pump-gears leads to the outside of the pump-casing ending in an analogous pipe-connection 40.

Passage 35 is normally the exhaust conduit of the pump and passage 38 is ordinarily the inlet passage of the pump when the vehicle is traveling forwardly, but of course these are reversed when the vehicle is backing up.

Each of the two rear wheels of the vehicle is thus equipped with its own individual pump of the type described, and, of course, the invention is susceptible of use on all four wheels of the automobile, if desired.

The construction involves also a single main-valve for simultaneously and equally controlling the liquid of the pumps of the two rear vehicle-wheels and such valve (see Figs. 6 to 11, inc.) includes a sectional valve-casing 41, the parts of which are held together by suitable bolts or screws 42, 42 in the usual way.

As is illustrated, the casing provides appropriate bearings 43 and 44 for an oscillatory valve-shaft 45 extended out of the casing through a stuffing-box 46, the protruding portion of the shaft having an arm 47 keyed thereon and adapted through suitable connecting mechanism 48 (Fig. 1) to be joined to the brake-pedal 49 of the vehicle.

Inside of the valve-casing, the shaft 45 has a cylindrical or round disc valve or ported rotor 50 keyed thereon and adapted to oscillate in a closely fitting surrounding ring 51 constituting an intermediate or central part of the valve-casing.

Such cylindrical valve-member 50 has two round ports 52, 52 extended through it at positions 180° apart, and, as the valve is turned about its axis, it is designed to bring such ports into or more or less out of register with corresponding passages in the valve-casing, the end of one of such passages, 53, being connected by a pipe or conduit 56 to the connection 37 of one of the gear-pump casings, so that the correlated valve port 52 controls the conduit connection with the gear-pump chamber through the opening 36.

The same portion of the same passage 53 on the same side of the valve-rotor 50 connects with a passage 57 in the valve-casing (Fig. 8) leading to an external pipe-connection 58 which is joined by a pipe or conduit 59 with the connection 37 of the gear-pump of the other vehicle-wheel.

Thus the corresponding parts of the chambers of the two pumps are operatively connected to the same passage 53 of the valve-casing.

In analogous manner, valve-passage 54 by means of a pipe 60 is joined to the pump-casing connection 40 of one pump and the same portion of passage 54 is in connection with a passage 61 (Fig. 8) in the valve-casing leading to an outer pipe-connection 62 which is joined by a pipe 63 with the connection 40 of the other pump.

That part of passage 53 at the other side of the ported valve-disc 50 is connected by a curved passage 64 in the valve-casing to an external pipe-connection 65, and in similar manner, the corresponding portion of passage 54 is connected by its passage 66 to its pipe-connection 67.

As is indicated in Figure 7, passage 64 is connected to passage 53 on the opposite side of the movable ported valve-member 50 by a right-angle conduit or by-pass 68 fitted with an outwardly-closing, inwardly-opening inlet-valve 69 equipped with a light-pressure spring 70 tending to keep it open, and likewise passage 66 is joined to its passage 54 by a right-angle by-pass conduit 71 fitted with a like spring-pressed valve 72.

Also passage 57 has a single by-pass 73 around the valve, one end of such by-pass opening into passage 57 (Fig. 11) and the other end communicating with passage 64 through a supplemental passage 74 (Fig. 8).

By-pass 73 is fitted with a spring-pressed ball safety-valve 75, the adjustment of the spring of which is such that an undue restriction on the flow of the oil through the circuit by reason of the action of valve 50 cannot occur, the safety-valve being so set that if an oil pressure tends to occur sufficient to lock or slide the vehicle-wheels under the imposed braking action effected by the pumps, the safety-valve will open and by-pass a sufficient quantity of the oil around the valve to preclude the happening of such an undesirable result.

In other words, the safety-valve allows full and adequate but not excessive braking action to take place.

Turning now to the liquid supply-tank 76 illustrated in detail in Figure 12, it will be observed that the bottom portion of the tank through a coupling 77 is connected to a pipe 78 secured at its other end to the connection 67 of the valve-casing, the tank being located at such an elevation on the chassis or body of the vehicle that the oil will flow by gravity out of the tank through the conduit 78 into the valve.

Tank 76 also has a central, upstanding conduit 79 extended through the bottom of the tank and connected at its lower end by a pipe 80 to the connection 65 of the valve-casing.

The central passage through such member 79 near its upper end has a spring-pressed, downwardly-closing valve 81 which, when open, permits the oil entering the tank through the connection 79 to be delivered through side discharge ports 82 into the tank above the normal oil-level therein.

The spring of the valve tends to keep the valve closed so that the valve causes a desirable slight back pressure in the oil circuit.

An additional and important function of such valve is to break up any large bubbles in the oil passing through it into small bubbles which can do no harm.

As is clearly shown the tank has a removable cap 83 permitting replenishing oil to be introduced into the tank as occasion requires, an overflow discharge pipe 84 for an obvious purpose, and a screen 85 below ports 82, 82 which divides the interior of the tank into an upper compartment 86 and a lower compartment 87, the function of the screen being to subdivide any bubbles in the oil passing downwardly through it into smaller harmless globules.

The upstanding conduit 79 at a position lower than the screen 85 has a plurality of lateral ports connecting the passage through member 79 with the tank chamber 87 below the screen, each of such ports having an outwardly-closing, inwardly-opening valve 88.

When oil enters the tank through pipe 80 and conduit 79 during forward travel of the vehicle, valve 81 opens under the pressure of the oil and valves 88 close, whereby the oil is admitted into the upper chamber 86 of the tank where the oil may be somewhat foamy or frothy, but the oil in such upper chamber in order to leave the tank through the pipe 78 must pass down through the screen which eliminates its frothy characteristic. On the other hand, when oil enters the lower portion of the tank through pipe 78 during backward travel of the vehicle, it is discharged from the tank through the then open valves 88 and pipe 80, valve 81 remaining closed which assures that oil substantially free from air will be delivered through pipe 80.

By reference to Figures 9 and 10, it will be perceived that the disc-valve 50 on the supply-tank side thereof (that is the left-hand side as viewed in Figure 9) has two recesses 152, 152 of substantially the same diameter as the valve-ports 52, and each such cavity 152 is joined by an oblique passage 153 to a small port 154 open at the pump side of the valve, whereby each port 52 has its own pressure-balancing recess 152 and associated port 154, the latter being at such an angular distance from its companion port 52 that well before port 52 passes out of register with its valve-casing passage 53 or 54, as the case may be, the correlated port 154 will come into register with such casing-port and thereby transmit the pressure on the pump side of the valve to its opposite side to prevent an undue unbalancing of pressures which would interfere with the easy turning of the valve, all as will be readily understood.

Reverting now to the gear-pump shown in Figures 3, 4, and 5, the gear-shaft 28 is provided with an axial bore 91 extended inwardly from one end of the shaft, the other end of the bore connecting with a cross passage 92, communicating with the chamber 93 of a stuffing-box structure associated with the shaft at one side of the pump-gear 29.

Chamber 94 at the end of shaft 28 is connected by an opening 95 and an extension 195 thereof to one end of the longitudinal bore of a screw-threaded plug 96, fitting in a cavity 196 of the casing, such bore at its other end opening into the cavity which in turn is in communication through a conduit 97 which passage 38 near port 39.

The bore of the plug is fitted with a ball check-valve 98 which closes the bore when moved outwardly and which opens the same when moved inwardly.

The pump-chamber with which port 39 connects is the suction or oil-admission part of the pump when the vehicle is advancing and hence the pump suction is normally exerted through the connected passages specified to the two chambers associated with the shaft, whereby the flow of lubricating oil through at least one of the shaft bearings is facilitated and leakage of oil at the other bearing is avoided.

From what precedes, it will be apparent that when the course of the vehicle is forward and valve 50 is fully open, the valve offers no obstruction to either of the valve conduits 53 and 54 and the oil is delivered from tank 76 through pipe 78, passages 66 and 54, valve-port 52, and the piping 60 and 63 into the two gear-pumps by which it is fed back through pipes 56 and 59, valve-casing passage 53, valve-port 52, pipe 80, conduit 79, valve 81, and passages 82 into the upper portion of the oil-reservoir.

Owing to such a relatively free and comparatively unobstructed flow of oil through the circuit or system by the two brake-pumps, no appreciable braking or vehicle retarding action is effected, the influence of the spring of valve 81 being negligible because of the slight pressure which it exerts on the valve.

If, however, valve 50 is rocked to partially-closed position, a corresponding impedance or resistance to the flow of the oil is produced with a commensurate or proportionate braking or restraining action on the pumps and their directly-associated vehicle-wheels.

Under the specified checked or curbed functionings of the brake-pumps, the inlet port 52 of valve 50 to the pumps is partially closed as well as its outlet port 52.

Under some conditions, this fractional shutting of the oil-inlet port 52 might result in an inadequate flow of oil into the pumps, and, to preclude such a possibility, both when the vehicle is moving forwardly as well as when it is traveling rearwardly, each valve-port is provided with its valve-controlled by-pass 68 communicating with the passage 53 on the pump side of the valve and connected with the passage 64 on the other side of the valve, or the like construction, in the case of passage 54, incorporating the right-angle passage 71 communicating with passage 54 on the pump side of the valve and connected with the passage 66 on the other side of the valve.

When either of the conduits 53 or 54 constitutes the oil-admission passage to the pumps, the vacuum tending to be created in such conduit opens the by-pass valve 69 or 72 and allows the free flow of the oil to the pumps around the main-valve 50, and, when either one of these conduits 53 or 54 accommodates the oil flowing from the pumps, the corresponding valve 68 or 72 is automatically closed under the existing pressure, thus closing the by-pass which it controls.

From what has been stated, it should be obvious that, when the brakes are applied by turning valve 50, valve 72 on the vacuum or intake side will automatically open to allow a free current of oil around the main-valve 50, but the companion valve 69 will be automatically closed by the oil pressure present at that point.

To prevent a too sudden or unduly violent application of the braking action, when the vehicle is traveling forwardly, as by an excessively quick turning or complete closing of the main duplex-valve 50, and a corresponding application of the brakes sufficiently forcibly to slide or lock the vehicle-wheels, the spring-closed, ball safety-valve 75, whose casing cavity is connected by the passage 73 on the pump side of the main-valve 50 with the valve conduit 57, such cavity being in communication by openings 74 and 174 with the passage 57 on the supply-tank side of the main-valve 50, will open.

If, therefore, the actuation of valve 50 tends to create too great a resistance or obstruction to the flow of oil during the braking operation with resulting correspondingly immoderate oil pressure, such pressure will open the safety-valve and maintain it open until the abnormal condition is removed, thereby assuring that the brakes cannot be applied in improper or excessive manner.

Owing to the high pressure on one side of the main, flat control-valve 50 during the ordinary braking action with the valve-ports partly closed, and, in order to render the operation of the valve comparatively easily accomplished, the pressure-balancing means hereinbefore referred to have been provided.

When the brakes are applied by moving valve 50 while the vehicle is advancing, the oil is supplied to the brake-pumps from the lower part 87 of the tank below the screen and it is therefore reasonably free from entrapped air and is ready for satisfactory action in the pumps, whereas were the oil drawn off from the upper chamber 86 of the tank there would be a possibility that it might be somewhat frothy and foamy.

When the vehicle is proceeding forwardly with the brakes inactive, there is, of course, no substantial oil pressure at any point in the system, but, when the brakes are made operative, a material oil pressure occurs in the pumps and any such pressure which finds its way into either one or both of chambers 93 or 94, by means of the connected passages described above, opens the ball check-valve 98 and readily finds its way back to the intake side of the pump.

When the automobile is backing and the valve 50 is partially closed to retard the movement of the vehicle, the same general action occurs as when the automobile is moving forwardly, except that the circulation of the oil takes place in the opposite direction through the system, although in both instances the liquid is withdrawn from the lower portion of the supply-tank and during reverse due to the fact that valves 88 are open, but, in this case, the intake chambers of the pumps become the pressure chambers and a portion of the oil pressure immediately closes the ball check-valve 98, thus assuring that the oil pressure will not reach either of the chambers 93 or 94.

Brakes in the form of gear-pumps directly connected to the vehicle-wheels operate smoothly, easily and satisfactorily. They require no adjustment. They are always equalized in their braking action. They have no friction surfaces to wear out and to require replacement. They are protected from foreign material and are not influenced detrimentally by weather, such as damp or rainy conditions. They do not squeal or squeak. They are self-lubricating. They cannot be applied too forcibly to slide or lock the wheels. The foot effort to apply them depends upon the amount of pedal depression and not upon the degree of force imposed on the pedal. These and other desirable advantages accrue from the employment of my improved and refined braking mechanism.

Those acquainted with this art will readily understand that the invention is not necessarily limited and restricted to the precise and exact features of construction herein set forth and that many changes, either minor or major in character, may be incorporated in the structure without departing from the substance and essence of the invention as defined by the appended claims and without the loss or sacrifice of any of its material benefits and advantages.

I claim:

1. In an hydraulic brake for vehicles, the combination of a carrying-wheel of the vehicle, a brake gear-pump operated in opposite directions by the rotation of said wheel in forward and rearward directions, a valve-casing having two passages therethrough, a main-valve having two ports in said valve-casing, means to move said valve to shift its ports substantially simultaneously into, and substantially more or less out of, register with said passages, whereby to render said passages open or more or less closed, conduits connecting said two passages at one side of said main-valve to the pump-chamber on opposite sides of the intermeshing portions of the gears of the pump, a liquid supply tank, and conduits connecting said two passages at the opposite side of said main-valve to said liquid supply tank.

2. In an hydraulic brake for vehicles, the combination of a carrying-wheel of the vehicle, a brake gear-pump operated in opposite directions by the rotation of said wheel in forward and rearward directions, a valve-casing having two passages therethrough, a main-valve having two ports in said valve-casing, means to move said valve to shift its ports substantially simultaneously into, and substantially more or less out of, register with said passages, whereby to render said passages open or more or less closed, conduits connecting said two passages at one side of said main-valve to the pump-chamber on opposite sides of the intermeshing portions of the gears of the pump, a liquid supply tank, conduits connecting said two passages at the opposite side of said main-valve to said liquid supply tank, a by-pass for each of said passages around said main-valve, and a check-valve in each of said by-passes opening toward that part of its said passage on the pump side of said main-valve, whereby each said by-pass check-valve may automatically open the by-pass to prevent restriction of liquid flow to the brake-pump and may automatically close said by-pass when the corresponding main-valve port impedes the flow of liquid from the brake-pump.

3. The structure presented in claim 1, in which the main-valve is in the form of a disc with its two ports extended therethrough, said disc having two recesses in one of its flat faces, each such recess having a passage connected therewith and extended through the disc and through the opposite face thereof at a point out of register with the recess and adjacent to the corresponding port, whereby at least in a measure to balance the pressures acting on the two faces of the disc.

4. The structure presented in claim 2 in which the main-valve is in the form of a disc with its two ports extended therethrough, said disc having two recesses in one of its flat faces, each such recess having a passage connected therewith and extended through the disc and through the opposite face thereof at a point out of register with the recess and adjacent to the corresponding port, whereby at least in a measure to balance the pressures acting on the two faces of the disc.

5. The structure presented in claim 1 in which said supply-tank has means in association with one of said tank-conduits to eliminate large bubbles in the liquid employed.

6. The structure presented in claim 2 in which said supply-tank has means in association with one of said tank-conduits to eliminate large bubbles in the liquid employed.

7. The structure presented in claim 1 in which said supply-tank is divided into upper and lower compartments by a screen, one of said tank-conduits communicating with said tank above said screen and the other of said conduits communicating with said tank below said screen, whereby the liquid passing through said screen will eliminate large bubbles, if any, in the liquid.

8. The structure presented in claim 2 in which said supply-tank is divided into upper and lower compartments by a screen, one of said tank-conduits communicating with said tank above said screen and the other of said conduits communicating with said tank below said screen, whereby the liquid passing through said screen will eliminate large bubbles, if any, in the liquid.

9. The structure presented in claim 1 in which one of said tank-conduits connects with the upper part of the interior of said tank and the other tank-conduit connects with the lower part of the interior of said tank, a first check-valve in said first-mentioned upper conduit, and a second check-valve in said first-mentioned upper conduit lower than said first check-valve and communicating with the lower portion of the interior of said tank, said first check-valve opening and said second check-valve closing when the liquid enters the tank through said first-mentioned upper conduit and said first check-valve closing and said second check-valve opening to deliver liquid from the lower part of the tank when said conduit acts to discharge liquid from said tank.

10. The structure presented in claim 1 in combination with a screen dividing said supply-tank into upper and lower compartments, and in which one of said tank-conduits connects with the interior of said tank above said screen and the other tank-conduit connects with the interior of said tank below said screen, a first upwardly-opening check-valve in said first-mentioned upper conduit, and a second check-valve in said first-mentioned conduit lower than said first check-valve and communicating with the interior of said tank below said screen, said first check-valve opening and said second check-valve closing when the liquid enters the tank through said first-mentioned upper conduit and said first check-valve closing and said second check-valve opening to deliver liquid from the tank below its screen when said first-mentioned upper conduit acts to discharge liquid from the tank.

11. In an hydraulic brake for vehicles, the combination of a carrying-wheel of the vehicle, a brake gear-pump connected to, and operated in opposite directions by the rotation of, said wheel in forward and rearward directions, said gear-pump having a shaft on which one of the pump-gears is mounted, a chamber associated with said shaft and adapted to receive liquid fed by said pump from said shaft, a conduit connecting said chamber with the intake side of said pump when the vehicle is traveling forwardly, and a check-valve in said conduit opening toward said pump and adapted to close automatically when the vehicle travels rearwardly by the pressure thereon of the liquid acted on by the pump.

12. The structure presented in claim 11 in combination with a second chamber associated with said shaft and adapted to receive liquid fed by said pump from the shaft, said chambers being on opposite sides of the gear on said shaft, and in which structure said conduit connects said two chambers with the intake side of the pump.

THEODORE L. MAISCH.